Jan. 29, 1957     M. PETROFF     2,779,920
AUDIO FREQUENCY METER
Filed Feb. 24, 1953
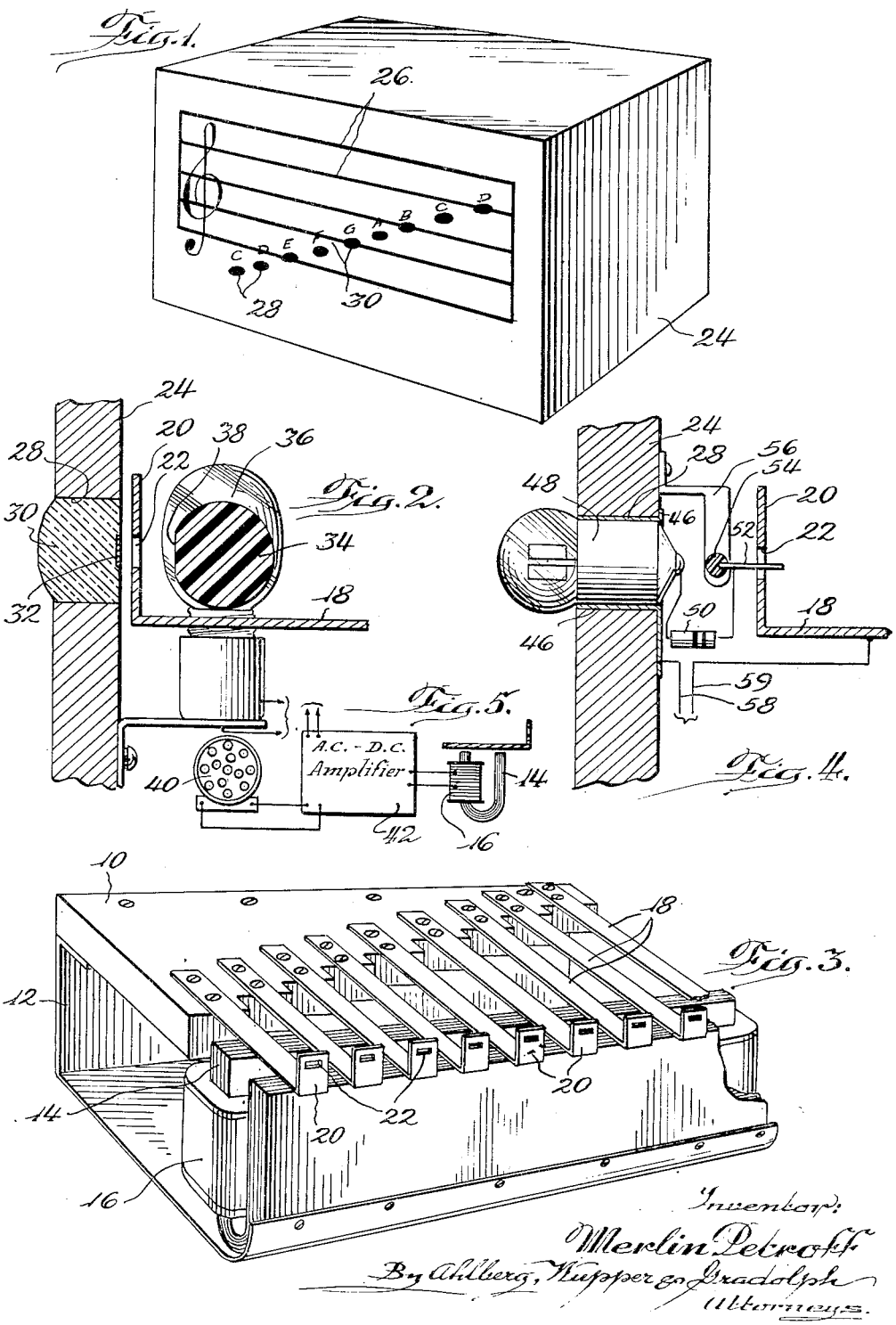

2,779,920

AUDIO FREQUENCY METER

Merlin Petroff, Round Lake Park, Ill.

Application February 24, 1953, Serial No. 338,406

2 Claims. (Cl. 324—80)

My invention relates generally to audio frequency meters, and more particularly to an improved apparatus for use in voice training to aid in acquiring ability to sing exactly at the correct pitch.

It is a primary object of my invention to provide an improved apparatus usable by teachers and students of voice, to provide simple and effective indication of whether a tone sung is of correct pitch, and usable to facilitate the tuning of instruments, such as the violin, to correct pitch.

Another object is to provide an improved audio frequency meter having novel means for indicating the frequency.

Other objects and advantages will become apparent from the following description, reference being had to the accompanying drawings in which:

Fig. 1 is a perspective view of the case of the apparatus;

Fig. 2 is a fragmentary sectional view, showing the means for indicating the vibration of a particular reed;

Fig. 3 is a perspective view of the vibratory reed assembly;

Fig. 4 is a fragmentary sectional view illustrating a modified means for indicating the vibration of a particular reed; and Fig. 5 is a diagrammatic view showing the manner in which the apparatus is used.

One of the difficulties of a student of voice is the acquisition of the ability to sing in exactly correct pitch. In the past such ability could be acquired only by singing with piano or other instrumental accompaniment, but such accompaniment in itself provided, as it were, a crutch, which in some instances detracted from rather than enhanced the rate of progress of the student in attaining this ability to sing in perfect pitch.

With the apparatus of the present invention, the singer or student has available a simple indicator to show him whether or not he is singing in correct pitch.

The apparatus comprises a reed type frequency meter best shown in Fig. 3, which consists of a plate 10 of substantial mass, this plate being rigidly secured to and supported by a frame 12. An elongated U-shaped laminated core 14 is suitably secured to the frame 12, and has a coil 16 wound about one leg thereof. Suitably secured to the block 10 are nine reeds 18, each having at its forward end an upwardly bent lug 20 provided with an aperture 22. The reeds are of different lengths, and are accurately tuned to the pitches of the notes of an octave plus one note of the diatonic tempered musical scale. By slightly changing the mass of the reeds, they may readily be tuned to an accuracy of plus or minus one or two cycles, which is sufficient for ordinary purposes, since the average ear cannot readily detect pitch differences greater than this. The sharpness of the tuning or the "Q" of the reeds may be predetermined and controlled by the hardness of the steel from which the reeds are made. The block 10 is preferably made of a soft steel and has sufficient mass so that it does not act to transmit vibrations of one reed to another.

The case 24 has a musical staff 26 marked on the front wall thereof, and is provided with a series of openings 28 located in positions representing the diatonic musical scale of the notes of middle C to D, an octave and a note higher.

The reed frequency meter assembly of Fig. 3 is suitably mounted at an angle within the case 24, so that the apertures 22 in the reeds 18 thereof are located directly behind the openings 28, as indicated in Fig. 2. Each of the openings 28 is preferably closed by a translucent faceted bull's-eye 30 of glass or the like. The portion of the rearward face of the bull's-eye which is directly in line with the aperture 22 of the reed when the latter is at rest, is provided with an opaque member 32 which may be inset in the bull's-eye or be in the form of a small piece of adhesive tape secured thereto. A rod 34 of a methyl methacrylate polymer, or similar material having the ability to serve as a conduit for light rays, extends behind the apertures 22 of the series of reeds and has one end illuminated by a suitable lamp 36 to permit emanation of light from the rod 34 through the aperture 22. To facilitate this the rod 34 has a flattened surface 38 facing the apertures 22.

In the use of the apparatus, as indicated in Fig. 5, the student sings into a carbon or dynamic microphone 40, which is suitably connected to an A. C.-D. C. amplifier 42, the output of which is connected to the coil 16 of the electromagnet which includes the laminated core 14. Depending upon the frequency of the fundamental of the tone, a particular reed 18 will commence vibrating and in doing so light from the methyl methacrylate polymer rod 34 will pass through the aperture 22 and bull's-eye 30 as the aperture moves away from the masking opaque member 32, and thus cause illumination of the bull's-eye 30 to provide an indication to the singer of the pitch of the note being sung. If the reeds 18 are sufficiently sharply tuned and are of high "Q," only one of the reeds 18 will be set into vibration to an extent sufficient to provide illumination for its associated bull's-eye 30. The singer will thus have available an accurate indication of whether the tone sung into the microphone 40 is of proper pitch, and by practice will rapidly acquire the ability to sing in the perfect pitch.

Instead of the method of indication shown in Fig. 2, that illustrated in Fig. 4 may be employed. In this construction the apertures 28 in the front wall of the case 24 are provided with sockets 46 for the reception of small neon glow tubes 48. The central terminal of each of the tubes 48 is connected by a suitable resistor 50 with a flexible contact wire 52, preferably made of silver or the like, and suitably held in an insulating rod 54 carried by brackets 56. The sockets 46 are connected to one terminal of a suitable source of energizing current, indicated by line conductors 58 and 59, the latter being connected to the block 10. Thus, when the reed 18 associated with a particular contact wire 52 is vibrated to a predetermined extent, it will make contact with its associated flexible contact wire 52 throughout portions of its vibratory strokes and thus cause flashing illumination of the neon tube 48. When the construction of Fig. 4 is employed it is, of course, not necessary that the ends 20 of the reeds be located directly behind the openings 28.

When the apparatus is used in voice training, it may be used to indicate pitches an octave below its normal range since in most voices the second harmonic is of substantial amplitude. Especially if such operation of the apparatus is desired, the amplifier 42 is constructed to have its highest gain in the interval which includes the middle C and the next eight higher notes of the diatonic scale (261.6 C. P. S. to 587.3 C. P. S.). In some instances both the second and third harmonics of a tone sung in the octave below middle C will lie within the normal range of the pitch indicator and in such instances two pitches may be indicated by the apparatus, but this will not be confusing because only the lower indicated pitch will be significant.

While I have shown and described preferred embodiments of my invention, it will be apparent that numerous variations and modifications thereof may be made without departing from the underlying principles of the invention. I therefore desire, by the following claims, to include within the scope of the invention all such variations and modifications by which substantially the results of my invention may be obtained through the use of substantially the same or equivalent means.

I claim:

1. In an apparatus of the class described, the combination of an electromagnetically energized reed type audio frequency meter having a plurality of vibratory reeds, each of the reeds having a light shutter at the end thereof, a source of light, and a casing surrounding the frequency meter and light source, said casing having a musical staff marked on one wall thereof and having light transmitting openings positioned to represent notes of a musical scale on the staff, said openings being normally closed respectively by the shutters of reeds having natural frequencies of vibration corresponding with the pitches of the notes represented by the openings and being effective whenever their associated reeds are vibrated to a substantial extent to uncover the openings to allow light from the source to pass through their associated openings and thereby provide an indication of the frequency supplied to the frequency meter.

2. The combination set forth in claim 1, in which the source of light comprises an electric lamp and a rod of methyl methacrylate having a light emitting surface adjacent the shutters.

References Cited in the file of this patent
UNITED STATES PATENTS

| | | |
|---|---|---|
| 1,742,869 | Mirfield | Jan. 7, 1930 |
| 2,178,563 | Cressy | Nov. 7, 1939 |
| 2,189,359 | Fields et al. | Feb. 6, 1940 |
| 2,270,294 | Hall | Jan. 20, 1942 |
| 2,420,232 | Deal | May 6, 1947 |
| 2,487,244 | Horvitch | Nov. 8, 1949 |